United States Patent [19]

Strauss et al.

[11] Patent Number: 5,284,700
[45] Date of Patent: Feb. 8, 1994

[54] FIRE-RESISTANT MINERAL FIBERS, STRUCTURES EMPLOYING SUCH MINERAL FIBERS AND PROCESSES FOR FORMING SAME

[75] Inventors: Carl R. Strauss, Newark; Richard D. Godfrey, Granville; Steven D. Crothers, Newark; Beverly A. Goudy, Columbus; Kathryn L. Brandenburg; Roy E. Shafer, both of Granville, all of Ohio

[73] Assignee: Owens-Corning Fiberglas Corporation, Toledo, Ohio

[21] Appl. No.: 823,602

[22] Filed: Jan. 17, 1992

Related U.S. Application Data

[63] Continuation of Ser. No. 416,816, Oct. 4, 1989, abandoned, which is a continuation-in-part of Ser. No. 320,858, Mar. 8, 1989, abandoned, which is a continuation of Ser. No. 118,593, Nov. 9, 1987, abandoned.

[51] Int. Cl.$^5$ .................. B27N 9/00; B32B 5/16; B32B 7/00; B32B 5/06
[52] U.S. Cl. ............................... 428/240; 428/245; 428/246; 428/247; 428/255; 428/256; 428/283; 428/284; 428/285; 428/288; 428/289; 428/298; 428/302; 428/920; 428/921
[58] Field of Search ............ 428/920, 921, 288, 389, 428/290, 276, 337, 240, 245, 246, 247, 255, 256, 283, 284, 285, 289, 298, 302

[56] References Cited

U.S. PATENT DOCUMENTS

| | | | |
|---|---|---|---|
| 724,788 | 4/1903 | Blenco | 428/921 |
| 2,415,113 | 2/1947 | Seymour et al. | 428/921 |
| 2,444,347 | 6/1948 | Gregor et al. | 428/921 |
| 3,027,272 | 3/1962 | Rätzel | 428/921 |
| 3,044,146 | 7/1962 | Thomas et al. | 428/285 |
| 3,416,953 | 12/1968 | Gutzeit et al. | 428/389 |
| 3,859,162 | 1/1975 | Johnson et al. | 428/337 |
| 3,934,066 | 1/1976 | Murch | 428/276 |
| 4,178,406 | 12/1979 | Russell | 428/285 |
| 4,184,311 | 1/1980 | Rood | 428/921 |
| 4,194,914 | 3/1980 | Moriya et al. | 428/389 |
| 4,419,401 | 12/1983 | Pearson | 428/276 |
| 4,448,841 | 5/1984 | Glass et al. | 428/921 |
| 4,476,175 | 10/1984 | Forry et al. | 428/288 |
| 4,683,165 | 7/1987 | Lindemann et al. | 428/290 |
| 4,690,859 | 9/1987 | Porter et al. | 428/920 |
| 4,702,861 | 10/1987 | Fornum | 428/920 |
| 4,707,304 | 11/1987 | Gomez | 428/920 |
| 4,746,565 | 5/1988 | Bafford et al. | 428/928 |
| 4,847,140 | 7/1989 | Jaskowski | 428/920 |
| 4,897,301 | 1/1990 | Uno et al. | 428/920 |

FOREIGN PATENT DOCUMENTS

| | | |
|---|---|---|
| 0284950 | 10/1988 | European Pat. Off. |
| 53-49199 | 5/1978 | Japan |
| 53-106828 | 9/1978 | Japan |

OTHER PUBLICATIONS

Ritter II et al., *Coated Ceramic Fibers*, Research Disclosure 218, p. 235, No. 21835, Jun., 1982.

*Primary Examiner*—George F. Lesmes
*Assistant Examiner*—James D. Withers
*Attorney, Agent, or Firm*—Ted C. Gillespie; Patrick P. Pacella; Bryan H. Davidson

[57] ABSTRACT

Mineral fibers, and products (e.g., building insulation products) formed of mineral fibers are treated, and thus rendered fire-resistant, by placing a phosphate-containing compound onto or in close proximity to the mineral fibers. The phosphate-containing compound is at least one which forms a high-temperature protective coating or layer on the surfaces of the mineral fibers. A preferred product of the invention will include two mineral wool layers with a septum carrying the phosphate-containing compound interposed therebetween. Exemplary phosphate-containing compounds include monoammonium phosphate, diammonium phosphate, dicalcium phosphate, monocalcium phosphate, phosphoric acid, aluminum phosphate, tetrasodium pyrophosphate, tetrapotassium pyrophosphate, sodium hexametaphosphate, potassium tripolyphosphate, sodium tripolyphosphate, ammonium polyphosphate, monosodium dihydrogen phosphate, and mixtures thereof.

17 Claims, 2 Drawing Sheets

FIRE-RESISTANT MINERAL FIBERS, STRUCTURES EMPLOYING SUCH MINERAL FIBERS AND PROCESSES FOR FORMING SAME

This is a continuation of application Ser. No. 07/416,816, filed on Oct. 4, 1989, now abandoned, which was a continuation-in-part of Ser. No. 07/320,858, filed Mar. 8, 1989, now abandoned, which was a continuation of Ser. No. 07/118,593, filed Nov. 9, 1987, now abandoned.

FIELD OF THE INVENTION

This invention relates to fire-resistant mineral fibers and, more particularly, to structures which employ such fire-resistant mineral fibers, (such as glass or rock wool, glass fiber mats, and the like), the fire-resistant mineral fiber structures of the invention being especially well suited for use as building insulation.

BACKGROUND AND SUMMARY OF THE INVENTION

Fire-resistant products are continually being sought for use in the building industry due to their obvious benefits of reducing the building occupants' risk of injury during fires. The theory behind the use of fire-resistant building materials is, of course, that such materials afford the building occupants more time to safely evacuate a burning building. While buildings typically now include a batting of mineral wool (e.g., glass wool) in interior wall cavities for the purpose of providing acoustical insulating properties, what has been needed is a mineral wool insulation which not only provides normal acoustical insulation properties, but which also is fire-resistant. It is towards the achievement of such a product that the present invention is directed.

According to this invention, it has been discovered that when an effective amount of a phosphate-containing compound (to be defined later) is brought into close proximity and/or contact with the surface of a mineral fiber (also to be defined later), and when the thus treated mineral fiber is exposed to temperatures well in excess of those which would normally melt an untreated fiber (e.g., temperatures in excess of about 649° C. (1200° F.)), the fiber nonetheless surprisingly withstands such elevated temperatures for significant time periods without melting.

What has been found according to the invention is that certain phosphate-containing compounds will form a protective high-temperature coating or layer on the mineral fiber surfaces when the treated fiber (i.e. a fiber having the phosphate-containing compounds in close proximity to and/or in contact with the fiber's surface) is exposed to thermal reaction conditions (i.e., elevated temperatures greater than about 300° C. (572° F.)).

Although not wishing to be bound to any particular theory, it is surmised that some of the phosphate-containing compounds which may be employed in the present invention are those which release phosphoric acid upon thermal degradation. This released phosphoric acid is believed to migrate to the surfaces of mineral fibers in close proximity and/or contact therewith where it reacts with the silica constituent of the glass to form a protective silicate phosphate ceramic coating or layer on the mineral fiber surfaces.

In fact, for certain phosphate-containing compounds, this migration phenomenon has been observed to, in effect, spread the protective ceramic coating to mineral fibers not actually in contact with, but in sufficiently close proximity to, the phosphate-containing compounds. It is this protective ceramic coating (as confirmed by X-ray diffraction analysis) that apparently renders the mineral fibers, mineral wool and mats of the invention capable of surprisingly withstanding the temperatures of an open flame for a significant period of time. That is, the mineral fibers, mineral wool and mats, and like products of this invention do not "burn through" when subjected to an open flame. Thus, the products of this invention exhibit "fire resistant" properties—that is, the products of this invention do not melt when exposed to open flame (i.e., temperatures normally melting untreated mineral fiber products). This property of the present invention is to be contrasted with "fire-retardant" properties—that is, products which merely inhibit flame spread, but do not necessarily resist flame burn through.

It is also surmised that phosphorous compounds which do not release phosphoric acid upon thermal degradation, offer protection of mineral fibers via formation of a high melting temperature phosphate surface coating or layer. In the case of some phosphate-containing compounds, it may be possible that a silicate phosphate ceramic and/or a high melting temperature phosphate coating is formed so as to impart fire-resistance properties to the mineral fibers.

The phosphate-containing compound can be brought into close proximity and/or contact with mineral fibers in any convenient manner, such as roll coating, spraying, dipping, sprinkling or padding. For example, when the mineral fibers are in the form of a glass wool, an aqueous mixture of the phosphate-containing compound may conveniently be sprayed via a conventional spray ring onto the glass fibers prior to their collection on a conveyor to form the glass wool. Also, in the particular case of glass wool, the phosphate-containing compound may be applied onto the glass fibers concurrently with an aqueous glass wool binder solution, in which case, the phosphate-containing compound is added to the binder solution prior to application.

In a particularly preferred technique, mineral wool (e.g., glass or rock wool) is bisected at or near its midplane after formation to form two mineral wool layers of substantially equal thicknesses between which a septum or substrate carrying the phosphate-containing compound is interposed. Thus, when the layers are brought into contact with respective surfaces of the septum, a composite "sandwich" structure is formed comprised of the two mineral wool layers and an interlayer comprised of the treated septum. A particularly preferred septum is a wet-laid nonwoven glass mat which is treated with the phosphate-containing compound.

The fire-resistant mineral fibers of the present invention may be embodied in a variety of structural forms, the presently preferred examples of which are mineral wool, mineral fiber mats and composite structures formed of such mineral wool and mineral fiber mats which are useful as building insulation. Accordingly, while reference has been, and will hereinafter be, made to mineral wool, mineral fiber mats, and building insulation products employing the same, it should be understood that such references are intended to identify presently preferred embodiments of, and utilities for, this invention and, therefore, are intended to be nonlimiting. Other advantages and uses of this invention will become apparent to those skilled in this art after careful consideration is given to the following detailed description.

BRIEF DESCRIPTION OF THE ACCOMPANYING DRAWINGS

Reference will be made to the accompanying drawings wherein.

DETAILED DESCRIPTION OF THE INVENTION

As used herein and in the accompanying claims, the term "phosphate-containing compound" is meant to refer to any compound which includes phosphate or phosphorus which, during thermal reaction conditions (i.e., at elevated temperatures above about 300° C. (572° F.)), forms a high temperature protective coating or layer on the mineral fiber surfaces (i.e. a coating or layer which is capable of withstanding temperatures in excess of those normally melting untreated mineral fibers).

One class of phosphate-containing compounds within the scope of the above definition includes compounds which release phosphoric acid upon thermal degradation. As previously described, this released phosphoric acid will apparently react with the silica constituent of the mineral fibers (particularly glass fibers) so as to form a fire-protective silicate phosphate ceramic coating (e.g., a silicate orthophosphate compound).

Other classes of phosphate-containing compounds which may be employed in the present invention include pyrophosphate and polyphosphate compounds (or compounds capable of forming pyrophosphate or polyphosphate compounds), preferably pyrophosphate and polyphosphate compounds which include metals of Groups I, II, or III of the Periodic Table.

Preferred phosphate-containing compounds according to the present invention will include at least one unit of the Formula I:

where X is $NH_4$, a Group I metal (e.g., Na, or K), a Group II metal (e.g., Ca), or a Group III metal (e.g., Al), and n is an integer greater than or equal to 1. Particularly preferred phosphate-containing compounds will be represented by the Formula II:

where X is as defined above, and n is an integer greater than or equal to zero.

Exemplary phosphate-containing compounds within the scope of the above definitions, and which are thus useful for the practice of this invention, include monoammonium phosphate, diammonium phosphate, dicalcium phosphate, monocalcium phosphate, phosphoric acid, aluminum phosphate, tetrasodium pyrophosphate, tetrapotassium pyrophosphate, sodium hexametaphosphate, potassium tripolyphosphate, sodium tripolyphosphate, ammonium polyphosphate, monosodium dihydrogen phosphate, and mixtures thereof.

The term "mineral fibers" as used herein is meant to refer to fibers made from minerals such as, rock, slag, glass, basalt, and the like. Thus, the term "mineral wool" is meant to refer to a wool or batting formed of such mineral fibers. Preferably, the phosphate-containing compounds as described above are applied to glass fibers which can be formed of any glass. For example, the glass fibers employed in forming the fire-resistant glass wool of the invention may be composed of standard insulation-grade wool glass. When utilizing a glass mat as a septum for the pyrophosphate and/or polyphosphate compounds, the mat is preferably of a nonwoven, wet-laid variety, but woven forms thereof may also be employed. Preferably, the mat is comprised of E-type glass but other glass types may be employed. The septum may also be formed of any other woven or nonwoven material, for example, kraft paper, wire mesh screen, etcetera, as long as it exhibits sufficient structural integrity to carry the phosphate-containing compounds. These non-glass septa thereby provide a means by which the phosphate-containing compounds may be brought into close proximity to and/or in contact with the glass wool and thus are not themselves necessarily rendered fire-resistant.

Presently, the preferred fire-resistant insulation structure of this invention will include a wet-laid nonwoven glass mat treated with dicalcium phosphate and interposed between two layers of glass wool. This preferred form of the invention exhibits the surprising property of dimensional stability at temperatures of up to at least 927° C. (1700° F.) in addition to an elevated melting temperature. The result is a non-shrinking flame barrier which synergistically cooperates with the glass wool to provide a superior performing composite structure in insulated wall applications.

Although not absolutely required, the phosphate-containing compound may be admixed with a silica to assist in the formation of a silicate phosphate ceramic coating, one preferred example of which is Ludox AS-40 (Dupont). When used in admixture with a binder solution for glass wool, it is preferred to use a colloidal silica suspension to facilitate dispersion in an aqueous binder system.

The phosphate-containing compound must be applied in sufficient amount to impart fire-resistant properties. It has been found, for example, that the fire-resistance properties of glass wool are enhanced with increased amounts of phosphate-containing compound up to a plateau level above which only marginal fire-resistance enhancement properties are observed. Preferably, the phosphate-containing compounds are applied to mineral wool (or to a septum in contact with the mineral wool) in an amount greater than 4.0 grams of elemental phosphorus per square meter (0.0008 pounds per square foot) of the substrate. As an example, for the preferred fire resistant wall product, i.e., a dicalcium phosphate treated glass mat interposed between two layers of glass wool, it has been found that as little as 17.2 grams of dicalcium phosphate per square meter (0.0035 pounds per square foot) provides sufficient fire resistance when the wall assembly is tested in accordance with ASTM E119 procedures.

Another example uses monoammonium phosphate and diammonium phosphate. Here, a mixture having a 63/37 weight proportion of monoammonium phosphate/diammonium phosphate is utilized, the mixture being preferably employed in an amount greater than about 69 grams of the mixture per square meter (1.4 pounds of the mixture per 100 square feet), and more preferably within the range of about 69 to 88 grams of the mixture per square meter (1.4 to 1.8 pounds of the mixture per 100 square feet).

Figure 1:
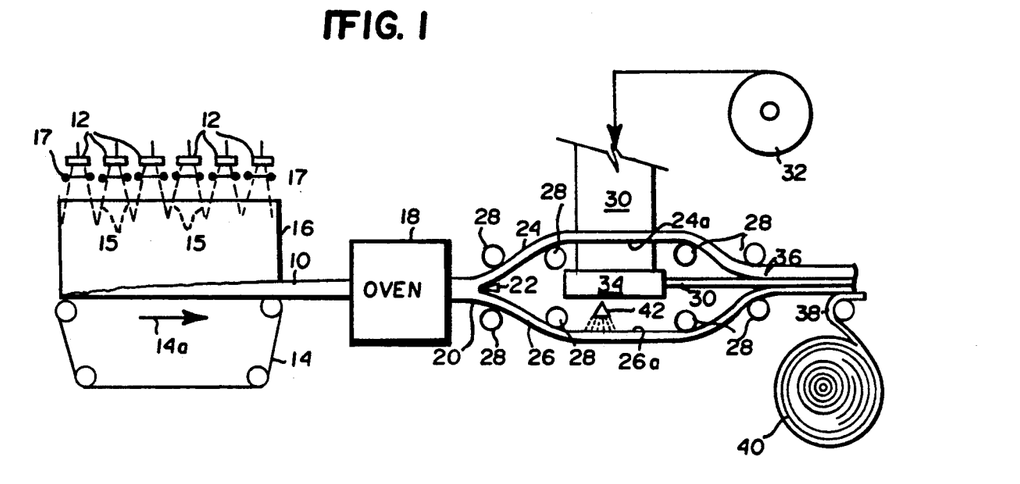
FIG. 1 is a schematic representation of a system for forming fire-resistant glass wool insulation product of this invention.

A presently preferred system for producing fire-resistant glass wool for building insulation is shown in accompanying FIG. 1. As is well known per se, a glass wool 10 comprised of attenuated glass filaments formed via spinners 12 is collected upon a continuous belt conveyor 14. The spinners 12 include perforated cylindrical walls so that when the spinners rotate, molten glass supplied to spinners 12 will pass through the perforations thereby forming a glass filament veil (noted by dashed line 15 in FIG. 1) within forming hood 16. The formed filaments thus collect upon conveyor 14 moving in the direction of arrow 14a. Preferably, a glass wool binder composition (of any variety well known to those in this art) is sprayed onto the surfaces of the formed glass fibers via spray rings 17 associated with each spinner 12.

The uncured glass wool 10 is then introduced into an oven 18 whereby the binder solution is cured to impart structural integrity to the batting. The cured batting (now designated by reference numeral 20) exits oven 18 and, in a particularly preferred embodiment of this invention, is longitudinally bisected at its midplane (or at any other desired horizontal plane) via a reciprocating knife or continuous band saw 22 so as to form upper and lower glass wool layers 24, 26, respectively. After the bisecting operation, layers 24 and 26 are separated from one another via suitable guide rolls 28.

A septum layer 30 which carries a previously applied phosphate-containing compound in accordance with this invention is directed from a supply roll 32 at right angles to the path of conveyance of glass wool 10 and is redirected via suitable turning rolls (schematically shown at reference numeral 34 in FIG. 1) so as to be interposed between layers 24 and 26. A suitable adhesive (for example, an aqueous latex or hot melt) is preferably applied to the inner surfaces 24a, 26a of layers 24 and 26, respectively, so that when layers 24, 26 are brought into contact with septum 30, a composite "sandwich" structure (noted by reference numeral 36) is formed. Although the insulation structure 36 is preferably "unfaced" when employed in interior wall cavities, a backing layer or facing of paper or metal foil 38 may be applied from a supply reel 40 thereof, particularly if the structure 36 is to be used in an exterior wall cavity.

Figure 2:
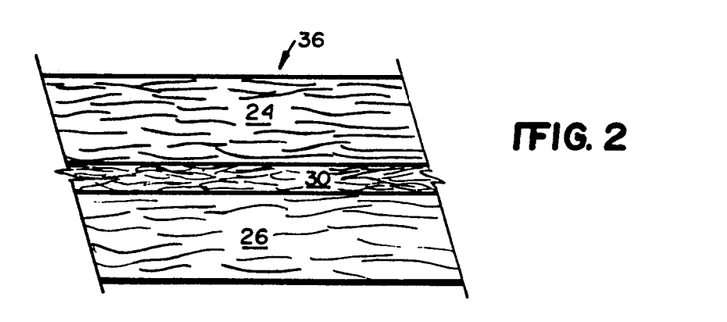
FIG. 2 is a schematic cross-sectional view of one form of the fire-resistant glass wool insulation product of this invention.

The resulting insulation structure 36 (absent facing 38) is shown more clearly in FIG. 2 (the layers thereof being shown in greatly enlarged manner for clarity of presentation). As is seen, the insulation structure 36 is composed of glass wool layers 24 and 26 with septum 30 interposed therebetween. Preferably, septum 30 is a nonwoven, wet-laid mat formed of E-type glass filaments. However, any other material may be employed as septum 30, for example, kraft paper, wire mesh screen, etcetera, as long as it is capable of "carrying" the phosphate-containing compound and is compatible with the particular phosphate-containing compound(s) being used. For example, when dicalcium phosphate is used, it is important that it be carried by a glass fiber mat since the dicalcium phosphate-treated mat has been observed to be a substantially nonshrinking fire-resistant barrier per se.

If the phosphate-containing compound is in the form of a substantially water-insoluble solid particulate, it is also preferable to apply a tackifying agent, such as polyvinyl alcohol, acrylic polymer latex adhesive (or other latex adhesives), etc., to the septum so that the compound remains evenly dispersed on the septum's surface during processing and/or handling. If the phosphate-containing compound is in the form of a water-insoluble solid particulate, it is most conveniently applied as part of the liquid binder during formation of the wet processed mat, and/or as a layer on the finished mat by roll or knife coating, spraying, dipping, etc. the phosphate-containing compound in the form of an aqueous mixture followed by drying so as to leave a residue of the phosphate-containing compound thereon.

Figure 3:
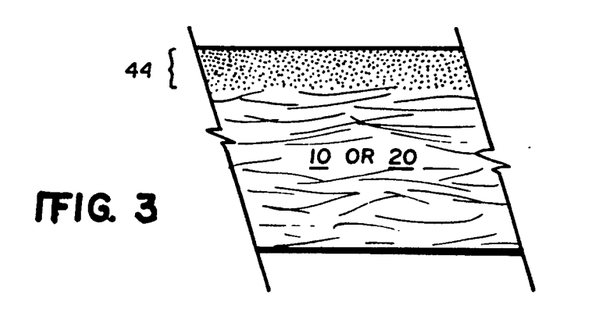
FIG. 3 is a schematic cross-sectional view of another form of the fire-resistant glass wool insulation product of this invention.

As an alternative for interposing septum 30 between layers 24 and 26 of batting 10, the phosphate-containing compound may be sprayed, coated, sprinkled, or otherwise applied to one or both of the surfaces 24a, 26a of layers 24, 26, respectively, as is shown schematically by nozzle 42 in FIG. 1. The compound(s) may also be sprayed, coated, sprinkled, or otherwise applied to either exterior surface of the uncured or cured batting 10, 20, respectively (as shown, for example, by impregnated layer 44 in FIG. 3).

In yet another alternative, the phosphate-containing compound may be placed in admixture with a glass wool binder, the binder/phosphate-containing compound mixture thereby being sprayed concurrently via spray rings 17. In such a case, the entire thickness of batting 10 will be impregnated with the phosphate-containing compound since the individual fibers thereof will be coated during their formation via the spinners 12. Of course, an additional series of spray rings could be employed downstream of spray rings 17 for the dedicated purpose of applying the phosphate-containing compound and the binder solution separately. In this alternative, the phosphate-containing compound is preferably applied to the glass fibers as an aqueous mixture, so that upon drying, a residue of the compound remains on the fiber's surface. However, the phosphate-containing compound may also be sprinkled onto the fibers if in a dry, particulate form.

Figure 4:
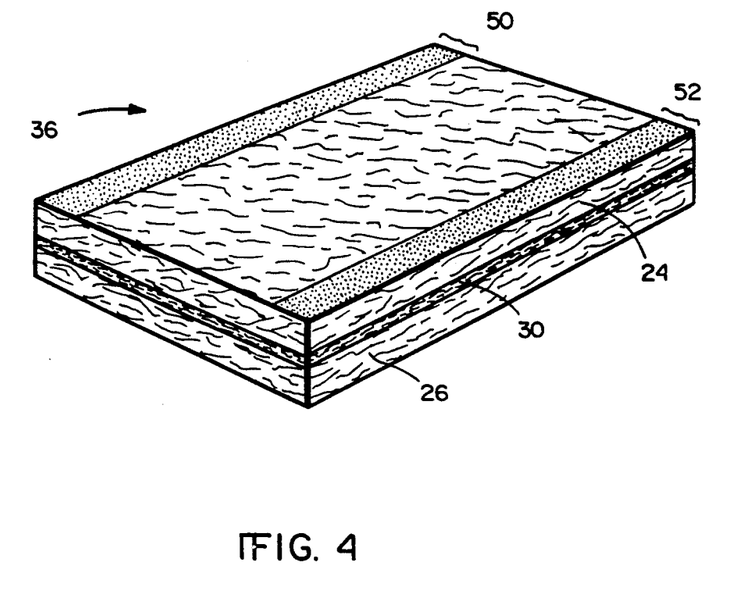
FIG. 4 is a schematic perspective view of yet another form of the fire resistant glass wool insulation product of this invention.

Accompanying FIG. 4 shows another embodiment of a glass wool batting according to this invention. As is shown, the batting 36 may be similar to that shown above in FIG. 2 in that it includes glass wool layers 24 and 26 with a septum 30 interposed therebetween. The septum 30 will preferably carry at least one of the phosphate-containing compounds described above. According to the embodiment of FIG. 4, however, opposing lateral edge regions 50, 52 on at least one surface of the batting 36 include a pyrophosphate and/or polyphosphate compound. In use, the batting 36 of FIG. 4 will be placed in a wall cavity between a pair of vertical wall studs (usually metal) so that the regions 50, 52 are adjacent to a respective one of the studs. It has been observed that less glass wool erosion from the edge of the mat 30 in the regions 50, 52 occurs during fire testing. Hence, better fire protection properties may ensue if the batting 36 includes regions 50, 52 positioned adjacent the wall studs as described above.

Although mention has been made of alternative methods for forming fire-resistant mineral fiber structures such as mineral wool, mineral fiber mats, etcetera, by bringing the phosphate containing compound(s) into direct contact with the mineral fibers, it is only necessary for certain phosphate-containing compounds to be in sufficiently close proximity to the mineral fibers. That is, for certain phosphate-containing compounds it has been discovered that actual physical contact between the phosphate-containing compound and the mineral fiber surfaces is not necessarily required in order to realize the fire-resistant properties when the mineral fibers are exposed to thermal reaction conditions. Thus, for example, it has been found that when a nonwoven glass septum treated with a sufficient amount of certain phosphate-containing compounds (e.g. monoammonium phosphate and diammonium phosphate) is interposed between upper and lower glass wool batting layers, and when the thus formed structure is exposed to temperatures in excess of those normally melting the glass wool (e.g. in excess of 649° C. (1200° F.)), the formation of protective silicate phosphate ceramic surprisingly extends outwardly from the septum and into each of the adjacent glass wool batting layers.

Therefore, as used herein, the term "close proximity" is intended to encompass the phosphate-containing compound being in physical contact with and/or sufficiently physically close to mineral fibers to permit a protective high temperature coating or layer (e.g., a silicate phosphate ceramic) to be formed on the fibers' surfaces.

The following nonlimiting examples will provide a further understanding of the invention.

EXAMPLE I

Samples representative of an insulated wall cavity were exposed to an ASTM E-119 time/temperature environment. The samples consisted of three layers: (1) 1.27 cm (½-inch) Type X gypsum board; (2) 9.21 cm (3⅝-inch), 8.0 kg/m$^3$ (0.5 lb/ft$^3$), R-1.9 Kelvin-meter$^2$/watt fiberglass insulation (R-11); and, (3) 1.27 cm (½-inch) Type X gypsum board. The insulation in one sample contained a septum treated with a fire resistant additive (FRA) located at the midplane of the insulation. The septum was composed of 80 grams per square meter (1.6 pound per 100 square foot) glass fiber, wet-laid mat treated with 80 grams per square meter (1.6 pounds per 100 square feet) of a mixture of monoammonium phosphate and diammonium phosphate in weight proportions of 63 to 37, respectively. The insulation was housed in a 0.3 meter by 0.3 meter (1-foot by 1-foot) galvanized metal box with flanges. The gypsum board was screw-attached to the top (room side) flange. The bottom (fire side) board was supported with wire mesh above the furnace opening.

The three-layer sample was placed over the furnace opening for 50 minutes, and was thereafter lifted to allow the bottom (fire-side) piece of gypsum board to be removed. The sample was then repositioned for an additional 10 minutes so that the insulation was directly exposed to the furnace temperature. The procedure was selected to simulate openings in walls observed in full-scale ASTM E-119 wall tests. Pairs of thermocouples were attached to both sides of the bottom (fire-side) and top (room side) pieces of gypsum board. The time/temperature histories of the top (room-side) surfaces of the gypsum board are listed below in Table 1.

TABLE 1

COMPARISON OF TOP (ROOM-SIDE) GYPSUM BOARD SURFACE THERMAL RESPONSE OF A STANDARD R-11 INSULATED SAMPLE WITH ONE CONTAINING A FRA-TREATED SEPTUM

| Time, Min. | Hot Side Temp. of Top Board $\phi$C. ($\phi$F.) | | Cool Side Temp. of Top Board, $\phi$C. ($\phi$F.) | |
|---|---|---|---|---|
| | Std. | FRA-Septum | Std. | FRA Septum |
| 10 | 62(143) | 58(137) | 39(102) | 34(94) |
| 20 | 79(175) | 68(154) | 53(127) | 48(118) |
| 30 | 154(310) | 124(256) | 65(149) | 61(142) |
| 40 | 180(356) | 158(316) | 86(186) | 77(171) |
| 50 | 204(400) | 184(363) | 91(195) | 85(185) |
| 55 | 816(1501) | 436(816) | 110(230) | 97(207) |
| 60 | 871(1599) | 554(1029) | 181(357) | 105(221) |

The above data show that the FRA-treated septum retards the heat flow to the top (room-side) gypsum board throughout the test period. And, especially so, after the bottom (fire-side) gypsum board was removed at 50 minutes. At the end of 60 minutes, the standard fiberglass batt was completely melted-out of the insulation cavity. For the sample with the treated septum, a midplane barrier was formed. The FRA in the mat appeared to migrate into the fiberglass insulation on either side of the septum when heated to form an approximate 1.3 cm (½-inch)-thick layer of silicate phosphate ceramic insulation/mat/insulation which provided thermal protection for the top (room-side) gypsum board.

EXAMPLE II

Two one-hour wall tests in accordance with ASTM standard E-119 were conducted. In each test, a 3.0 meter×3.0 meter (10'×10') partition was prepared consisting of (a) 9.21 cm (3⅝-inch) deep, 0.048 cm (0.019-inch) thick, steel studs spaced 61 cm (24 inches) on center which are friction fitted between 9.21 cm (3⅝-inch) deep steel top and bottom tracks; (b) 8.89 cm (3½-inch) thick, R-1.9 Kelvin-meter$^2$/watt (R-11) glass wool insulation product having a septum of 80 grams/meter$^2$ (1.6 pounds/100 ft$^2$) glass fiber mat located in its midplane; and (c) 1.27 cm (½-inch) thick Type X gypsum wall board placed vertically over the studs and fastened with 2.54 cm (one inch) Type S drywall screws spaced 30.5 cm (12-inch) o.c. in the field and 20.3 cm (8-inch) o.c. at the joints, the joints being taped and coated, along with the screw heads, with joint cement.

The septum for the first test was treated with 160 grams/meter$^2$ (3.2 pounds/100 ft$^2$) of a fire retardant additive (FRA), while the septum for the second test was treated with 70 grams/meter$^2$ (1.4 pounds/100 ft$^2$) of FRA. In each test, the FRA consisted of a 63/37 weight proportion of monoammonium phosphate/- diammonium phosphate. The results appear below in Table 2:

TABLE 2
RESULTS OF ONE-HOUR E-119 WALL TESTS

| Test No. | FRA amt. grams/m2 (lbs/100 Ft$^2$) | Endurance | E-119 Pass/Fail |
|---|---|---|---|
| 1 | 160 (3.2) | 1 hour | pass |
| 2 | 70 (1.4) | 57 min. 30 sec. | fail |

The "failure" of test number 2 was apparently caused by lateral shrinkage resulting in a void space on or near a stud which, in turn, led to increased local heat transfer. The thermocouple positioned nearest the stud therefore recorded a temperature at 57 minutes, 30 seconds in excess of the maximum single temperature allowed by ASTM E-119. Similar shrinkage was observed in Test No. 1, but it did not lead to failure prior to 1 hour. Failure of the sample of Test No. 1, however, occurred shortly thereafter at 61 minutes, 30 seconds. Notwithstanding this, these tests dramatically show the effect of this invention since an untreated glass wool R-1.9 Kelvin-meter$^2$/watt (R-11) insulation product in a similarly configured partition lasts for only between 45 to 50 minutes when subjected to ASTM E-119 testing.

EXAMPLE III

The following phosphate-containing compounds were screened for possible fire retardant properties:
Dicalcium Phosphate ($CaHPO_4 \cdot 2H_2O$)
Monocalcium Phosphate ($Ca(H_2PO_4)_2 \cdot H_2O$)
Phosphoric Acid ($H_3PO_4$)
Aluminum Phosphate ($Al(H_2PO_4)_3 \cdot xH_2O$)
Monosodium Dihydrogen Phosphate ($NaH_2PO_4 \cdot 2H_2O$)
Dipotassium Hydrogen Phosphate ($K_2HPO_4$)
Disodium Hydrogen Phosphate ($Na_2HPO_4 \cdot 7H_2O$)

Solutions of 50% by weight of each phosphate-containing compound (except dicalcium phosphate which was 25% by weight of an aqueous slurry) were applied onto a "shingle mat" (i.e. an E-type glass fiber wet-laid nonwoven mat) and each mat was then dried in a conventional oven at 150° C. The dried and treated mats were then subjected to laboratory burn-through screening tests in which the mats were subjected to an open flame for arbitrary time periods. Those treated mats which did not burn through after being subjected to the flame for a period of time significantly in excess of one minute were deemed to be suitable phosphate-containing compounds in accordance with this invention since untreated mats would have burned through in only a few seconds (e.g. less than about 5 seconds). The following observations were made:

| Compound | Observations |
|---|---|
| Dicalcium Phosphate | No burn through at 60 minutes. |
| Monocalcium Phosphate | Ditto at 20 mins. |
| Phosphoric Acid | Ditto at 30 mins. |
| Aluminum Phosphate | Ditto at 30 mins. |
| Monosodium Dihydrogen Phosphate | Ditto at 20 mins. |
| Dipotassium Hydrogen Phosphate | Burn through <1 min. |
| Disodium Hydrogen Phosphate | Burn through <1 min. |

The above observations show that whereas dicalcium phosphate, monocalcium phosphate, phosphoric acid, aluminum phosphate and monosodium dihydrogen phosphate impart fire-resistant properties to glass fibers (and hence may be used in accordance with this invention), dipotassium hydrogen phosphate and disodium hydrogen phosphate do not.

EXAMPLE IV

Samples representative of the region around the stud in a gypsum faced, insulated galvanized steel stud wall were exposed to a constant temperature of 927° C. (1700° F.) on one face. The samples consisted of the following three layers:
1. Two pieces of 1.27 cm (½-inch) Type X gypsum board, butt-joined over a steel stud;
2. Two pieces of 9.21 cm (3⅝-inch), 8.01 Kg per cubic meter (0.5 lb/ft$^3$), R-1.9 Kelvin-meter$^2$/watt (R-11) fiberglass insulation with treated septum on either side of the steel stud; and
3. One piece of 1.27 cm (½-inch) Type X gypsum board.

The insulation/steel stud assembly was housed in a 0.3 meter by 0.3 meter (1 ft × 1 ft) galvanized steel test box with flanges. The gypsum board was screw-attached to the flanges of the test box and to the galvanized steel stud crossing from side-to-side dividing the box into two approximately equal compartments.

Both sets of insulation samples contained septa treated with fire-resistant additives (FRA) located at the midplane of the insulation. The septa for one set was composed of 80 grams per square meter (1.6 pound per 100 square feet) glass fiber, wet-laid mat treated with 70 grams per square meter (1.4 pounds per 100 square feet) of a mixture of monoammonium phosphate and diammonium phosphate (MAP/DAP) in weight proportions of 63 to 37, respectively. The instrumented set of septa were made with the same glass mat but were treated with 105 grams per square meter (2.1-pounds-per-100-square-feet) of dicalcium phosphate.

The room side gypsum surface was instrumented with four (4) thermocouples located 7.6 cm (three (3) inches) from the center of the specimen. Two were located over the stud. Two were located on either side of the stud. Each thermocouple was covered with an insulating pad.

The furnace was pre-heated to 927° C. (1700° F.) and the specimens were positioned with the gypsum joint facing the furnace in a downward position. The instrumented gypsum face was oriented upwardly toward the room.

The temperature in the furnace was held constant at 927° C. (1700° F.), and the temperature on the room side gypsum surface was recorded for an hour. In every case, the temperatures over the stud exceeded those adjacent to the stud. Table 3 below lists the highest temperature recorded for each specimen.

TABLE 3
HIGHEST GYPSUM SURFACE TEMPERATURE RECORD OVER THE STUD FOR TWO TYPES OF FIRE RESISTANT ADDITIVE TREATED GLASS MAT SEPTA, $\phi$C. ($\phi$F.)

| Time Mins. | Ammonium Phosphate Mixture | | Dicalcium Phosphate | |
|---|---|---|---|---|
| | No. 1-3 | No. 1-4 | No. 2-3 | No. 2-4 |
| 10 | 58 (136) | 58 (136) | 61 (142) | 62 (143) |
| 20 | 76 (168) | 71 (159) | 68 (155) | 72 (161) |
| 30 | 87 (189) | 82 (180) | 78 (172) | 83 (182) |
| 40 | 98 (209) | 94 (202) | 85 (185) | 93 (199) |

TABLE 3-continued

HIGHEST GYPSUM SURFACE TEMPERATURE RECORD OVER THE STUD FOR TWO TYPES OF FIRE RESISTANT ADDITIVE TREATED GLASS MAT SEPTA, $\phi$C. ($\phi$F.)

| Time | Ammonium Phosphate Mixture | | Dicalcium Phosphate | |
|---|---|---|---|---|
| Mins. | No. 1-3 | No. 1-4 | No. 2-3 | No. 2-4 |
| 50 | 126 (258) | 145 (293) | 95 (203) | 104 (220) |
| 55 | 161 (321) | 183 (361) | 102 (215) | 123 (253) |
| 60 | 189 (372) | 219 (427) | 117 (242) | 154 (309) |

These data show that specimens containing septa treated with dicalcium phosphate result in lower maximum gypsum surface temperatures in the critical time period beyond forty (40) minutes.

In all cases the butt-joint on the fire side opened to approximately 1.0 cm (⅜ inch) allowing hot furnace gases to impinge on the insulation septum sandwich. For the ammonium phosphate treated septa, an overcrust of modified wool batting was formed over the treated mat. However, near the stud, wool batting and mat erosion were noted as being approximately 1.0 cm (⅜ inch).

For the dicalcium phosphate-treated specimens, the wool batting around the stud was melted back approximately 3.8 cm (1½ inches) exposing the treated mat which remained flush against the stud.

It appeared that the dicalcium phosphate treated mat had not shrunk even though exposed to temperatures approaching 927° C. (1700° F.), thus providing a flame barrier and protecting the wool batting above. For the ammonium phosphate specimen, more beneficial outgasing of phosphate-containing compounds occurred but erosion near the stud appears to have allowed the hot gases to by-pass the mat to the room-side wool batting and adjacent stud.

EXAMPLE V

Example IV was repeated with the exception that the steel stud was not present in the test box. The samples were otherwise exposed to the same environment as in Example IV. Upon completion of the tests, the mats were removed and their widths measured. It was observed that those mats treated with ammonium phosphate shrank approximately 3% as compared to their original widths while no shrinkage was observed for those mats treated with dicalcium phosphate.

The observations of Examples IV and V suggest that the non-shrinking dicalcium phosphate treated mat performs better than the ammonium phosphate treated mat in the region of the stud although formation of a high melting phosphate compound in the adjacent wool batting due to migration is apparently diminished with use of dicalcium phosphate.

EXAMPLE VI

Equivalent 8.9 cm (3½") thick layers of (1) an "experimental sample" of standard R-1.9 Kelvin-meter²/watt (R-11) glass wool insulation product impregnated with an additive of 50/30/20 (parts by weight) composition of MAP/DAP/SiO$_2$ (MAP=monoammonium phosphate, DAP=diammonium phosphate; SiO$_2$=colloidal silica, Ludox AS-40, DuPont) at an additive add-on of 50 grams per square meter (1.0 pounds per 100 square feet) of insulation and (2) a "control sample" of R-1.9 (R-11) unfaced standard glass wool insulation product were prepared.

The samples were each installed in a wall section measuring 122 cm (48")×171 cm (67.5") using yellow pine lumber studs spaced 60.1 cm (two feet) on centers and having 1.6 cm (⅝") fire-rated drywall screwed on the top and bottom thereof. Four thermocouples were located over each sample on top of the drywall. The thus prepared wall was placed in a furnace having five thermocouples located in it, and was subjected to the time/temperature conditions of ASTM Standard E119. The results are tabulated below in Table 4:

TABLE 4

| Time (Minutes) | Average Temperature of Experimental Sample (Degrees C.(F.)) | Average Temperature of Control Sample (Degrees C(F)) | Average Furnace Temperature Degrees C.(F.) |
|---|---|---|---|
| 1 | 20 (68) | 21 (70) | 79 (175) |
| 5 | 21 (69) | 22 (71) | 763 (1406) |
| 10 | 37 (99) | 38 (100) | 702 (1296) |
| 15 | 51 (123) | 52 (125) | 747 (1376) |
| 20 | 59 (138) | 59 (138) | 795 (1463) |
| 25 | 60 (140) | 60 (140) | 812 (1494) |
| 30 | 65 (149) | 70 (158) | 835 (1535) |
| 35 | 75 (167) | 79 (174) | 856 (1572) |
| 40 | 82 (179) | 87 (188) | 872 (1601) |
| 45 | 86 (187) | 89 (192) | 879 (1615) |
| 50 | 88 (191) | 92 (197) | 892 (1638) |
| 55 | 89 (193) | 94 (202) | 898 (1648) |
| 60 | 93 (199) | 101 (214) | 907 (1664) |
| 65 | 101 (214) | 109 (229) | 928 (1702) |
| 70 | 107 (224) | 114 (238) | 934 (1714) |
| 75 | 111 (232) | 119 (246) | 937 (1719) |
| 80 | 115 (239) | 128 (263) | 943 (1730) |
| 85 | 119 (247) | 190 (374) | 949 (1740) |
| 90 | 127 (261) | 283 (542) | 953 (1747) |
| 95 | 155 (311) | 386 (726) | 957 (1755) |
| 100 | 217 (422) | 512 (953) | 965 (1769) |

These data indicate that the experimental sample had lower drywall surface temperatures than the control for all times beyond 25 minutes. One criteria of failure used in full-scale ASTM E119 testing is that the average surface temperature not exceed +139° C. (+250° F.) over the initial sample temperature. Although small-scale tests tend to overestimate fire endurance, these results indicate that the experimental sample's endurance was approximately 15 minutes longer than the control.

EXAMPLE VII

The following 52 cm (20.5")×52 cm (20.5") samples were prepared using standard R-1.9 Kelvin-meter²/watt (R-11) glass wool insulation product:

| Sample No. | Sample Weight (g) | Parts by Weight MAP/DAP/SiO$_2$ |
|---|---|---|
| 1 | 157.4 | none |
| 2 | 151.6 | 50/30/20 |
| 3 | 144.6 | none |
| 4 | 147.8 | 25/5520 |
| 5 | 155.5 | 25/55/20 |
| 6 | 143.5 | 50/30/20 |
| 7 | 161.0 | 50/30/20 |

Each sample was tested in accordance with Underwriters Laboratory (UL) Standard 181 dated Aug. 17, 1981 for factory-made air duct materials and air duct connectors, Section 8, Flame Penetration Test. According to UL Standard 181, material must not burn through before 30 minutes have elapsed from exposure to an open flame. The flame used in this Example VII had temperatures in the range of 1190° C. to 1260° C. The results appear in Table 5 below:

TABLE 5

| | UL 181 Test Results | |
|---|---|---|
| Sample No. | Pass/Fail | Observations |
| 1 | Fail | Burn through at 23 mins., 34 secs. |
| 2 | Pass | No burn through after 30 mins. |
| 3 | Fail | Burn through at 6 mins., 26 secs. |
| 4 | Pass | No burn through after 30 mins. |
| 5 | Pass | No burn through after 30 mins. |
| 6 | Pass | No burn through after 30 mins. |
| 7 | Pass | No burn through after 30 mins. |

Sample Nos. 2 and 4–7, treated in accordance with the invention, passed UL Standard 181 thereby qualifying for a Class I rating.

EXAMPLE VIII

Aqueous coating solutions having the following compositions were prepared:

| | Composition (Grams) | |
|---|---|---|
| | A | B |
| Water (tap) | 85 | 85 |
| Urea (Prilled) | 5 | 5 |
| MAP (100%) | 6 | 6 |
| DAP (100%) | 3.6 | 3.6 |
| DuPont Ludox AS (40%) | 6 | 6 |
| Phenolic Binder Resin | — | 4 |

Each coating composition was stirred and then sprayed onto an 20 cm × 20 cm (8" × 8") sample of R-3.3 Kelvin-meter$^2$/watt (R-19) glass wool insulation product and cured for 30 minutes at 177° C. (350° F.). The samples were then heated with a Bunsen burner playing against the coated surface. In each instance, the samples in the localized area of the flame turned black but did not melt the glass fibers. An untreated R-3.3 (R-19) glass wool insulation product, however, showed melted glass in the localized area of flame impact.

EXAMPLE IX

The following aqueous additive compositions were prepared, all components being expressed in grams:

| | Sample Nos. | | | | |
|---|---|---|---|---|---|
| Component | 1 | 2 | 3 | 4 | 5 |
| Water | 85 | 85 | 85 | 85 | 85 |
| MAP | 9.6 | — | 4 | 6 | 4 |
| DAP | — | 9.6 | 2.5 | 3.6 | 2.5 |
| DuPont Ludox AS-40 | 6 | 6 | 9 | 6 | 12 |
| Phenolic Binder Resin | 11.9 | 11.9 | 11.9 | 11.9 | 11.9 |

The above compositions were applied by spraying onto a surface of standard glass wool insulation product and the thus treated samples were dried at 150° C. for 1 hour. The dried samples were subsequently screened by playing a Bunsen burner flame against the treated surface for arbitrary time periods. Those samples did not burn through after being subjected to the flame for a period of time significantly in excess of one minute, were deemed to be suitable phosphate-containing compositions in accordance with this invention since untreated glass wool samples would have burned through in only a few seconds (e.g. less than about 10 seconds). The following observations were made:

| Sample No. | Observations |
|---|---|
| 1 | No burn through at more than 9 minutes |
| 2 | No burn through at more than 6 minutes |
| 3 | No burn through at 11 minutes |
| 4 | No burn through at more than 10 minutes |
| 5 | No burn through at more than 12 minutes |

The above data demonstrate that all of the tested compositions imparted fire-resistant properties to the glass wool and hence may be used in accordance with this invention.

EXAMPLE X

The following pyrophosphate and polyphosphate compounds in the indicated dry weight quantities were separately applied onto a 15.2 cm × 15.2 cm (6 in. × 6 in.) glass mat (i.e., an E-type glass fiber wet-laid nonwoven mat):

Tetrasodium Pyrophosphate (3.17 grams)
Tetrapotassium Pyrophosphate (3.76 grams)
Sodium Hexametaphosphate (3.49 grams)
Potassium Tripolyphosphate (4.04 grams)
Sodium Tripolyphosphate (3.86 grams)

Each of the treated mats was then subjected to a laboratory burn-through test in which the treated mats were placed approximately 10.2 cm (4 inches) above an open flame of a Bunsen burner. The temperature of the flame at the mat was about 1093° C. (2000° F.). Each of the treated mats did not exhibit any burn through after exposure to the open flame for fifteen minutes, after which the test was terminated.

For comparison purposes, untreated glass mats were exposed to an open flame of a Bunsen burner in a similar manner as described above. The flame burned through the mat in less than 20 seconds.

The above observations show that pyrophosphates and polyphosphates provide fire resistant properties to glass fibers at temperatures normally melting the glass fibers—i.e., since the untreated glass fiber mats exhibited burn through in a very short period of time, whereas the mats treated with the pyrophosphates and polyphosphates in accordance with this invention did not burn through even after fifteen minutes of exposure to an open flame.

EXAMPLE XI

An aqueous coating solution composed of ammonium polyphosphate and an acrylic binder in the dry weight proportions of 50:30 was applied to opposite side edges of a square sample of glass fiber mat (Owens-Corning Fiberglas Corporation) in approximately 1.9 cm (¾ inch) wide strips. The glass fiber mat that was used for this Example II already carried 130 grams of dicalcium phosphate per square meter (2.6 pounds of dicalcium phosphate per 100 square feet) of the mat. The treated mat was then interposed between two layers (each 4.4 cm (1¾ inches) thick) of a horizontally bisected batting of R-1.9 (R11) glass wool insulation. The strips of the composition on the opposite side edges of the mat served as an adhesive to bond the mat to each of the glass wool layers.

The composite glass wool sample mentioned above was then placed in an assembly which simulates a one-hour wall test according to ASTM E-119. This test involves a gypsum faced, insulated galvanized stud wall construction exposed to a constant temperature of 1700° F. The temperatures on the "room side" gypsum board were recorded until they reached criteria set forth in ASTM E-119.

The bottom gypsum board was then removed (after allowing the wall construction to cool) and the composite glass wool sample was examined. Visual observation of the composite sample showed no burn through. In addition, wool erosion was limited along the edges of the glass wool to which the polyphosphate was applied. This effect contributed to the improved fire-resistant performance relative to a control sample to which only dicalcium phosphate was applied.

EXAMPLE XII

A coating composed of ammonium polyphosphate and acrylic binder in the dry weight proportions of 410:55 was spray-coated onto a glass fiber mat in an amount of about 65 grams of the ammonium polyphosphate per square meter (1.3 pounds per 100 square feet) of the mat. The treated glass mat was then subjected to a laboratory burn-through test as described in Example X above. The treated mat of this Example XII did not exhibit any burn through after exposure to the open flame for fifteen minutes, after which the test was terminated.

EXAMPLE XIII

Quarter-scale, gypsum-faced, insulated galvanized steel stud wall samples representative of previously tested full-scale samples were tested in a vertical panel furnace. The 1.4 meter wide by 1.7 meter high (4½ feet by 5½ feet) samples, consisted of the following three layers:

(1) 1.27 cm (½ inch) thick type X gypsum boards up to 122 cm (48 inches) wide, butt jointed along vertical joints over 9.2 cm (3⅝ inches) deep galvanized steel studs 61 cm (24 inches) on center;

(2) Bisected 9.2 cm (3⅝ inches) thick, 8.0 kilogram per cubic meter (0.5 pounds per cubic foot), R-1.9 Kelvin-meter$^2$/watt (R-11) fiberglass insulation with a dicalcium phosphate treated glass mat septum placed between the layers; and (3) Another layer of 1.27 cm (½ inch) thick, type X gypsum board butt jointed vertically but offset from layer (1) by 61 cm (24 inches).

The gypsum boards were screw-attached to the steel studs at 20.3 cm (8 inches) on center along vertical joints and 30.5 cm (12 inches) on center in the field. Joint compound was applied to the joints and screw heads with paper tape imbedded in the compound over all joints.

Six samples were tested which explored a range of dicalcium phosphate application levels as well as its application method on the glass mat septum. Two of the samples were coated using a knife-coating process. The dicalcium phosphate levels were 117 and 59 grams per square meter (2.4 and 1.2 pounds per 100 square feet). The sample with 117 g/m$^2$ (2.4 lb/100 ft$^2$) was the reference sample and was the basis for U.L. Design No. U468 (see, U.L. report entitled "Glass Fiber Batts for Use in Nonbearing Wall Assemblies" dated Feb. 11, 1988). The other four samples were produced with a wet-laid process where the binder contained dicalcium phosphate at levels of 108, 57, 32, and 17 grams per square meter (2.20, 1.16, 0.66 and 0.35 pounds per 100 square feet).

The tests were conducted in accordance with ASTM E119 with the fire-side exposed to open flame temperatures ranging up to 927° C. (1700° F.) at one hour. The thermal response of the unexposed-side was monitored with thermocouples placed under insulating pads per the test method.

The data below shows that reducing the dicalcium phosphate level did not adversely affect fire resistance performance of the assembly. In addition, all of the samples containing wet-laid mat exceeded the reference sample.

| Application Process | Dicalcium Phosphate Level, gm/m$^2$ (lbs/100 ft$^2$) | Increased to Failure, Mins. |
|---|---|---|
| Knife | 117 (2.4) | Ref. |
| Knife | 59 (1.2) | 1.5 |
| Wet-Laid | 108 (2.20) | 2.5 |
| Wet-Laid | 57 (1.16) | 5.0 |
| Wet-Laid | 32 (0.66) | 1.5 |
| Wet-Laid | 17 (0.35) | 0.5 |

It is believed that the enhanced performance of the wet-laid mats relative to the knife-coated mats is due to more uniform coating of the glass fibers with the dicalcium phosphate containing binder than can be achieved by knife-coating one side of the glass mat.

It will thus be seen that according to the invention an effective treatment of glass fiber and glass fiber articles, to provide fire resistance to the fiber and articles, has been provided. While the invention has been described in connection with what is presently considered to be the most practical and preferred embodiments thereof, it is to be understood that the invention is not to be limited to the disclosed embodiments, but on the contrary, is intended to cover various modifications and equivalent arrangements included within the spirit and scope of the appended claims.

We claim:

1. A fire-resistant building insulation product consisting essentially of mineral wool and dicalcium phosphate in close proximity to said mineral wool, said dicalcium phosphate being present in an amount sufficient to form a high temperature coating on at least a portion of the mineral wool in close proximity thereto so that when the insulation product is exposed to elevated temperatures normally melting untreated mineral wool, the formed high temperature coating enables the mineral wool portion to withstand such elevated temperatures without melting, whereby the product is rendered fire-resistant.

2. A fire-resistant product as in claim 1, wherein said dicalcium phosphate is present in an amount greater than about 0.35 pounds per 100 square feet of said mineral wool.

3. A fire-resistant product as in claim 1 or 2, which includes a septum for carrying said dicalcium phosphate, said septum being interposed between layers of said mineral wool.

4. A fire-resistant product as in claim 3, wherein said septum is a mineral fiber mat, and wherein said dicalcium phosphate is present in an amount to form a high temperature protective coating on the mineral fibers of said mat.

5. A fire-resistant product as in claim 4, wherein said mineral wool layers are of substantially equal thicknesses so that said mat is located substantially at the midplane of said insulation product.

6. A fire-resistant building insulation product comprising a batting of glass wool having a fire-resistant layer which consists essentially of dicalcium phosphate in close proximity to said glass wool of said batting, wherein said dicalcium phosphate is present in an amount which provides at least about 0.0008 pounds of elemental phosphorus per square foot of said batting so as to form a high-temperature protective coating on the glass wool in close proximity to said layer when said product is exposed to temperatures greater than about 300° C.

7. A product as in claim 6, wherein said layer includes a surface region of said glass wool batting impregnated with said dicalcium phosphate so that said dicalcium phosphate is in contact with at least a portion of said glass wool forming the said batting surface region.

8. A product as in claim 6, wherein said layer includes a septum interposed between layers of said glass wool batting, wherein said dicalcium phosphate is carried by said septum.

9. A fire-resistant mineral wool insulation product consisting essentially of at least two layers of mineral wool and a septum interposed therebetween, said septum carrying dicalcium phosphate in an amount which provides at least about 0.0008 pounds of elemental phosphorus per square foot of said septum so as to form a high-temperature protective coating on said mineral wool when said fire-resistant mineral wool insulation product is exposed to temperatures greater than about 300° C., whereby said product is fire-protected.

10. A product as in claim 9, wherein said septum is a glass fiber mat.

11. A product as in claim 10, wherein said mineral wool layers are of substantially equal thicknesses so that said mat is located substantially at the midplane of said product.

12. A product as in claim 10, wherein said mat is a nonwoven glass fiber mat.

13. A product as in claim 10, wherein said septum is paper.

14. A product as in claim 10, wherein said septum is wire mesh screen.

15. A fire-resistant glass wool insulation product having a Class I rating and consisting essentially of at least two layers of glass wool batting and a substrate interposed therebetween, said substrate carrying dicalcium phosphate which renders said glass wool batting fire-resistant, wherein the dicalcium phosphate is present in an amount sufficient to provide at least about 0.0008 pounds of elemental phosphorus per square foot of the batting.

16. A fire-resistant building insulation product consisting essentially of glass wool and dicalcium phosphate in close proximity to said glass wool, said dicalcium phosphate being present in an amount greater than about 0.35 pounds per 100 square feet of said glass wool, said dicalcium phosphate rendering the glass wool fire-resistant by forming a high temperature phosphate compound in response to said building insulation product being exposed to an elevated temperature sufficient to thermally decompose said dicalcium phosphate, whereby said product is fire-resistant.

17. A fire-resistant building insulation product which consisting essentially of a glass fiber substrate, and dicalcium phosphate carried by said substrate and present in an amount greater than about 0.35 pounds per 100 square feet of said substrate.

* * * * *